J. B. NORRIS.
Plows.
No. 145,120. Patented Dec 2, 1873.
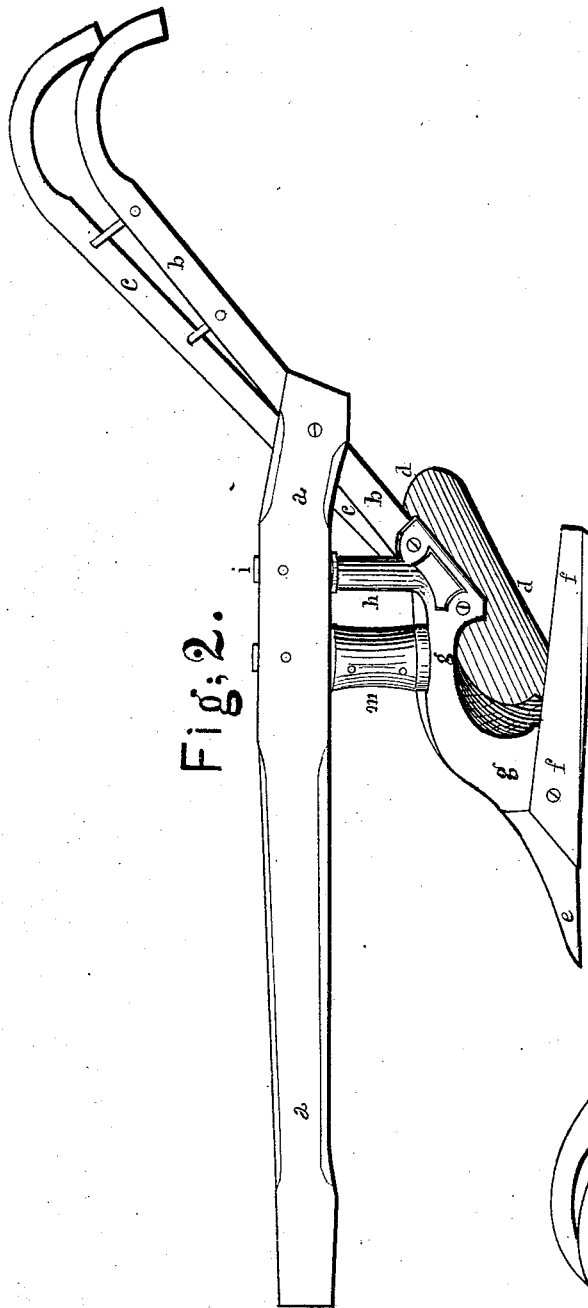
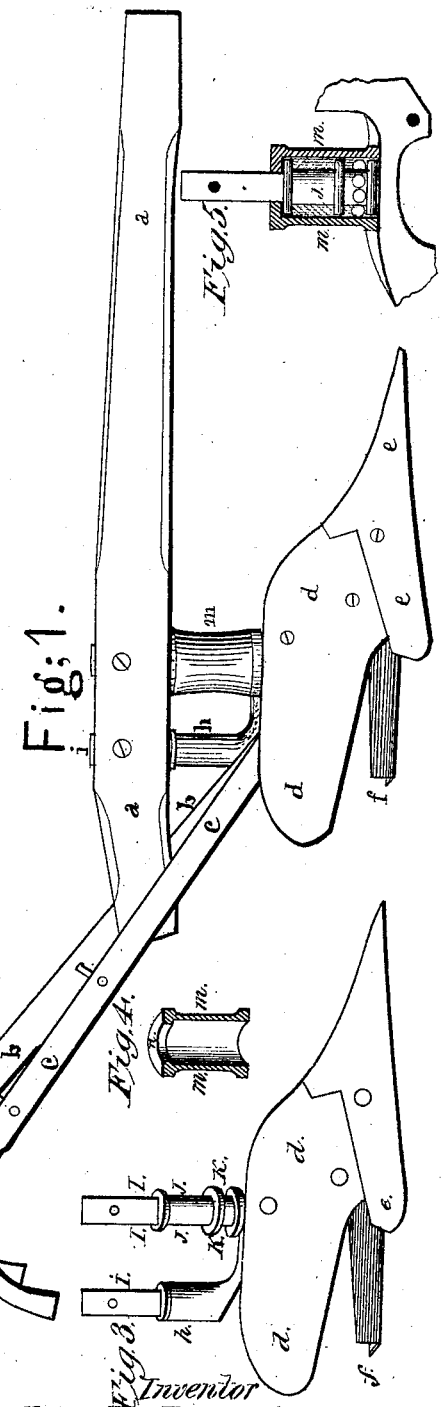
Attest
E. M. Gallaher
Wm. F. Browne
Inventor
John B. Norris,
By his Attorney
Jno. S. Gallaher Jr.

UNITED STATES PATENT OFFICE.

JOHN B. NORRIS, OF RICHMOND, VIRGINIA.

IMPROVEMENT IN PLOWS.

Specification forming part of Letters Patent No. 145,120, dated December 2, 1873; application filed September 10, 1873.

*To all whom it may concern:*

Be it known that I, JOHN B. NORRIS, of Richmond, Henrico county, Virginia, have invented certain Improvement in Plows, of which the following is a specification:

My invention relates to certain improvements in plows for agricultural purposes, the object of which is to prevent weeds, rubbish, and other obstructions choking or clogging the plow.

In plowing fields where there is rank growth of vegetable matter, the obstruction and delay caused by the choking of a plow amount to very great inconvenience and no little labor, with much loss of time, as all persons familiar with farming are aware.

With the advance of agricultural science, many contrivances have been devised to obviate and overcome the difficulty of plowing in foul or weedy land with plows as ordinarily constructed, which being formed of a horizontal draft-beam, carrying an ordinary mold-board formed with an extended piece of rigid vertical metal as a neck or stem, an angle is formed at the junction of beam and neck of the plow; consequently, in plowing in weedy land, or where there is other long growth, the rubbish, as the plow advances, gathers and accumulates and lodges beneath the beam, against the neck or stem of the plow. This accumulation or tangled mass of rubbish has to be cleaned off either by the hand or foot of the plowman, or by some other means, and frequently the plow becomes so clogged as to be moved with great difficulty in the furrow. Necessity in agricultural experience has, therefore, suggested various modes or means of attaining the object so much needed.

The nature of my invention consists in forming the upper part of the land-side with two stems or necks, the front or forward one being provided with a loosely-working movable collar, as will be more fully explained; also, in the employment with the movable collar, in order to cause it to rotate freely around the body of the stem, of spherical balls of metal as friction-surfaces inside of the cylindrical collar, as shown in Fig. 5 by the four small circles.

A reference to the several accompanying diagrams will show and explain the various parts of the plow.

Figure 1 represents a right-hand-side view of the plow, *a a* being the ordinary beam; *b b c c*, the handles or helves; *d d*, the mold-board; *e e*, the share; *f f*, the land-strip or base of land-side *g g*. The stem or main neck *h h*, of suitable size, is formed with extended tenon *i i*.

Fig. 2 is a left-hand-side view of the plow, the letters of reference thereon marking the same parts, as in Fig. 1.

Fig. 3 is a view of the mold-board *d d* detached from the beam, with the share *e e*, the land-strip or base *f f* of the land-side *g g*, and the stem or main neck *h h i i*. Letters J J mark the front or supplemental stem or neck, one-half of which is formed solid and roller-like, of suitable size; and near its base, next the top of the land-side, said neck is formed with a suitable channel or groove, K K, of required width and depth, and also about midway of its length a suitable collar or fixed ring, I I, is formed.

Fig. 4 represents a vertical section of a suitable cylindrical collar, *m m*, its outer surface or circumference being shaped either perfectly straight, concave, or convex. The upper end, on the inner side, is formed with a suitable flange or rim, *n*, with a circular opening slightly larger than the body of the stem. The collar *m m* fits neatly over the front or supplemental stem or neck J J, as shown in Figs. 1 and 2. Within the groove or channel K K of the stem or neck J J are inserted a number of suitable metal balls, (not represented in the drawings,) designed to act as friction-surfaces, so that the collar *m m* will bear against them and rotate smoothly, evenly, and readily, in order to perform its office of casting off the rubbish striking against its surface as the plow moves forward.

Fig. 5 represents a fragment of the upper part of the land-side, and the cylinder or drum *m m*, within which are arranged the anti-friction balls, as delineated by the four small circles.

I am well aware that various-shaped colters, fore-irons, lever devices, pendent rods with rollers, drag-chains, and other appliances have been from time to time employed, but with very limited results; and I am also aware that the land-side part of plows has been formed with two continuations running upwardly, connecting either with the beam or beam and handle, to give strength; but none of such forms of plows do I claim, as they cannot be adapted to the use of the moving collar.

In plowing with my plow, the draft is found to be very easy, with greatly reduced strain, and when rubbish of any kind comes in contact with the collar $m\ m$ the rubbish or other obstacle glances off to one side or the other, thereby effectually preventing the choking or clogging beneath the beam, and around the neck or stem of the plow; and as the movable collar effectually performs the office of throwing off any thing coming in contact with it, the plowman is relieved of the usual labor and trouble of using his hands or feet, or other means, to clear away the obstruction.

I am aware that one or more rollers, arranged or situated in advance, separate and apart from the neck or stem of a plow, on a spindle or on rods, are old and well-known devices for casting weeds and rubbish from plows; therefore such attachments and arrangements on spindles or rods I do not claim. I am also aware that spheres or balls have long been used as anti-friction devices or appliances to journal-boxes and other machinery, but such devices or appliances in themselves I do not claim; but What I do claim is—

The combination of anti-friction balls with a roller, cylinder, or drum, $m\ m$, and neck or stem J K I of a plow, in the manner as shown in Figs. 3 and 5, for the purpose substantially as set forth and described.

JOHN B. $\overset{\text{his}}{\times}$ NORRIS.
mark.

Witnesses:
JESSE CHILD,
A. K. SELDEN.